3,409,706
THERMOSTABLE, CHLORINE-CONTAINING PLASTICS MIXTURES
Hans-Helmut Frey and Richard Huth, Frankfurt am Main, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 219,127, Aug. 24, 1962. This application Dec. 28, 1966, Ser. No. 605,164
6 Claims. (Cl. 260—897)

ABSTRACT OF THE DISCLOSURE

Thermostable, chlorine-containing plastics mixtures consisting of compatible blends of (I) a chlorinated homopolymer of ethylene or a copolymer of ethylene with a minor amount of an alpha mono-olefin having 3–4 carbon atoms, the chlorinated homo- or co-polymer containing 68–75% by weight of chlorine, and (II) a chlorinated homopolymer of ethylene or a copolymer of ethylene with a minor amount of an olefin having 3–4 carbon atoms, said chlorinated homo- or co-polymer containing 25–50% by weight of chlorine, are disclosed.

---

This application is a continuation-in-part of our application Ser. No. 219,127 filed Aug. 24, 1962, and now abandoned.

The present invention relates to thermostable, chlorine-containing plastics mixtures.

Polyvinyl chloride has very favorable properties for many fields of application, such as hardness and stiffness, fireproofness, thermostability and resistance to weathering. Less favorable are its impact strength and its thermal stability under load. The impact strength can be improved in many ways, for example by adding plasticizers or by producing copolymers or polymer mixtures. The improvement of the impact strength always involves, however, a greater or smaller reduction of the thermal stability under load.

On the other hand, the thermal stability under load of polyvinyl chloride can be improved, for example by after-chlorination, whereby the polyvinyl chloride becomes more brittle and in most cases the thermostability is strongly reduced. According to the solvent process relatively low molecular weight chlorination products can only be obtained having a chlorine content of about 65%, so that the increase of the thermal stability under load of polyvinyl chloride is limited. An after-chlorination of polyvinyl chloride in water leads to heterogeneous chlorination products which are extremely brittle. By combining water and solvent, for example chloroform, products having a high chlorine content can be obtained. The water-chloroform or water-carbon tetrachloride mixture makes, however, very high demands on the material of the reaction vessel, all the more since the reaction must be carried out at a temperature above 50° C. in order to attain economic periods of reaction. Still further, the removal of the residual solvent from the chlorination product is difficult on account of swelling phenomena. Thus the after-chlorination of polyvinyl chloride requires considerable technical expenditures so that after-chlorinated polyvinyl chloride is quite expensive. It costs three to four times the price of polyvinyl chloride.

Attempts have, therefore, been made to produce in simple and economic manner polymers having a high chlorine content, a better thermal stability under load than polyvinyl chloride and a good impact strength. A plastic of this kind is very interesting from an industrial point of view. It is not yet possible, for example, to produce in economic manner pipings for hot water from plastic material. Polyvinyl chloride would be suitable on account of its low weight as compared with metal pipings, its easy manipulation, its good creep rupture strength and its fireproofness if its thermal stability under load were sufficient.

It is an object of the present invention to provide polymer mixtures of chlorinated polyethylenes having different chlorine contents which do have the aforesaid advantages. The polymer mixtures of the invention have a thermal stability under load according to Vicat of about 90° C., a modulus in torsion of more than 1000 kg./cm.$^2$ at 80° C., a notched bar impact strength of at least 3 and preferably above 4 cm. kg./cm.$^2$ and a good thermostability. The mixtures of the invention consist of compatible blends of (I) 95–75 parts by weight of a chlorinated polymer of 100–95% by weight of ethylene and 0–5% by weight of an alpha monoolefin having 3–4 carbon atoms, the chlorinated polymer containing 68–75% by weight of chlorine, and (II) 5–25 parts by weight of a chlorinated polymer of 100–95% by weight of ethylene and 0–5% by weight of an olefin having 3–4 carbon atoms, said chlorinated polymer containing 25–50% by weight of chlorine, both chlorinated polymers being obtained by chlorinating a linear polyolefin having a density of 0.94 to 0.96, a reduced specific viscosity of 1.5 to 10 measured in a 0.5% solution in tetrahydronaphthalene and a crystallite melting point of 127–136° C., and both chlorinated polymers being insoluble in carbon tetrachloride at room temperature and at most partially soluble in carbon tetrachloride at its boiling point.

The polymers can be obtained by chlorinating according to the process of British Patents 828,938 and 882,524 linear polyethylenes having a density of 0.94 to 0.96, a reduced specific viscosity of 1.5 to 10, measured in a 0.5% solution in tetrahydronaphthalene at 120° C. and a crystallite melting point of 127–136° C.

The linear polyethylenes are chlorinated in simple and economic manner in aqueous dispersion at a temperature above 100–110° C. At the beginning of the chlorination up to a chlorine content of at least 10%, and especially 25 to 65% it is possible to operate at a lower temperature, the chlorination then being continued at a higher temperature. In this process it is of advantage to admix with the polyethylene, prior to the chlorination, other inert organic or inorganic materials.

Chloropolyethylenes which are especially suitable for making the mixtures of the invention are obtained by chlorinating mixtures of linear polyethylene with polyvinyl chloride at a temperature in the range of 110, preferably 115° C. and 150° C., or by chlorinating said mixture first at a temperature below 100–110° C. and 150° C. and then at a temperature above 110° C., at least 20% of chlorine being incorporated in the last step.

The highly chlorinated polyethylenes produced according to this process have an excellent thermal stability under load and a good thermostability. However, when they are used alone they have too low an impact strength, i.e. they are too brittle. Moreover, they are difficult to process, yielding, for example, a rugged sheet from the mill, which is very troublesome, for example in the manufacture of tubes, in that no smooth and unobjectionable tubes can be produced with the usual machines. The linear polyethylenes used in the chlorination are preferably produced by a low pressure polymerization process according to Ziegler, as described, for example in Belgian Patent 538,782. Further indications concerning the manufacture of polyethylene by the low pressure process can be found, inter alia, in "Polyethylene" by Raff-Allison, Interscience Publishers 1956, pages 72–81. Especially suitable are polyethylenes having a molecular weight above 30,000 and reduced viscosity in the range of 1.5 to 10 and preferably 1.5 to 5, determined in a 0.5% solution in tetrahydronaphthalene at 120° C. Polyethylenes having a higher molecular weight than corresponds to a reduced viscosity of 10 yield useful chlorination products, but the processing of such high molecular weight products is more difficult.

The mixtures of the invention can likewise be made from chlorinated polymers which, in addition to ethylene, contain at most 5% by weight of propylene or butene.

Mixtures of chlorinated polyethylenes having varying chlorine contents have already been described, but the known mixtures substantially differ from the claimed mixtures in that they are made from different polyolefines and by other chlorination processes and do not have simultaneously a good thermal stability under load, a good impact strength and a good thermostability. The properties of highly chlorinated polyethylenes largely depend, even with the same chlorine content, on the chlorination conditions.

For example, when a linear polyethylene having a reduced viscosity of 1.8 is chlorinated in aqueous dispersion at a temperature below 80° C., a completely inhomogeneous product is obtained which is extremely brittle and so thermo-unstable that it cannot be processed. When the chlorination is carried out at a temperature in the range of 90 to 100° C., products are obtained which are soluble in warm and cold carbon tetrachloride but have a low thermostability. As compared therewith, a chlorination carried out at a temperature above 110° C. yields the chloropolyethylenes used for making the mixtures of the invention and having a good thermal stability under load and a good thermo-stability.

The mixtures of high and low chlorinated polyethylenes can be further improved by adding thereto polymers having a high thermal stability under load (Vicat temperature above 100° C.) in an amount of 5 to 50% by weight and preferably 5 to 30% by weight, calculated on the mixture of the chlorinated polyethylenes. Polymers of this type are styrene-acrylonitrile copolymers, polymers of methacrylic acid esters and copolymers preponderantly consisting of methylmethacrylate. Polymers of methylmethacrylate are especially advantageous. By the addition of such polymers there is not only improved the thermal stability under load but also the flow of the heated mixtures, while the impact strength is only slightly reduced. Especially the latter phenomenon indicates that the mixtures of three polymers according to the invention, i.e. of high and low chlorinated polyethylenes and polymethylmethacrylate have a behaviour that is in contradiction to the known experiences. When polymethylmethacrylate is added to polyvinylchloride or low chlorinated polyolefins or mixtures thereof, the toughness of the blends is considerably impaired as to be expected on account of the relatively high brittleness of polymethylmethacrylate.

In view of their high thermal stability under load, high impact strength and their good capacity for being shaped, the mixtures of the invention can be used in many fields, above all for applications for which polyvinyl chloride is unsuitable on account of its low thermal stability under load and its low impact strength. The mixtures of the invention can be made into pipings for hot water and other profiles subjected to the action of heat. Foils and sheets can be produced by calendering, pressing or extruding and further processed by the deep drawing process.

On account of their good electric values the mixtures can also be used in the electro-industry, for example for the manufacture of cables having a high thermal stability under load. Still further, they can be used for making hollow bodies, for example bottles, by the usual process. Due to the good flow of the material the mixtures can also be injection-molded. By the use of customary plasticizers for polyvinylchloride, soft and flexible articles can be produced, which have a high thermal stability under load than the known soft polyvinyl chloride mixtures.

The mixtures of the invention can be processed under the same conditions as hard polyvinyl chloride. It is possible to add other polymers, stabilizers, lubricants, plasticizers, color pigments and fillers in order to obtain special effects. Stabilizers must be added in any case, the usual stabilizers for hard polyvinyl chloride being suitable.

The following examples serve to illustrate the invention but they are not intended to limit it thereto, the parts being by weight unless otherwise stated.

Example 1

In an enameled vessel 100 parts of powdery low pressure polyethylene, prepared by the Ziegler low pressure polymerization process and having a reduced specific viscosity of 1.8 determined in a 0.5% solution in tetrahydronaphthalene at 120° C., were chlorinated at 111° C. in 900 parts of water and under a pressure of 2 atmospheres gauge until it contained 70% of chlorine. 490 parts of chlorine were consumed. After having withdrawn the acid reaction water, washed the reaction product three times with water and dried at 60° C., 330 parts of chlorination product were obtained.

The chlorination product was rolled at 175° C. with the addition of 1% of dibutyl-tin maleate as stabilizer and 1% of sliding wax. It was very brittle and adhered to the rolls. As compared therewith, a mixture of 80 parts of the chlorination product and 20 parts of a chlorination product which had been made from the same polyethylene under identical conditions, but which had been chlorinated to a chlorine content of 40% only, could be satisfactorily rolled. A mixture of this kind had a high thermal stability under load and a high elasticity as shown by the following data: (in comparison with polyvinyl chloride)

|  | Mixture | PVC |
|---|---|---|
| Notched bar impact strength at 20° C. (DIN 53453) | 4 | 3 cm. kg./cm.² |
| Vicat dimensional stability (VDE 0302) | 102° | 81° C. |
| Martens dimensional stability (DIN 53458) | 83° | 64° C |
| Modulus in torsion at 80° C. (ASTM-D 1043-51) | 1,600 | 100 kg./cm.² |
| Modulus in torsion at 100° C. (ASTM-D 1043-51) | 900 kg./cm.² | Too soft, not measurable. |

The corresponding data for the not elastified chlorination product could not be measured since it was not possible to punch out specimens on account of too high a brittleness of the material.

When the same low pressure polyethylene was chlorinated to a chlorine content of 70% at a temperature of 98° C. only, the product obtained was extremely brittle and tacky on rolling at 175° C. Even a mixture of 80 parts of said latter chlorination product with 20 parts of the aforesaid chloropolyethylene having a chlorine content of 40% was still brittle and had a notched bar impact strength of 1–2 cm. kg./cm.² only. Moreover, the latter mixture had a much lower thermal stability under load than a mixture according to the invention as resulted from a Vicat dimensional stability of 75° C. and a Martens dimensional stability of 65° C. The modulus in torsion at 80° C. could not be measured, the material was too soft at said temperature.

Example 2

In analogy to Example 1 the same low pressure polyethylene powder was chlorinated in water at 116° C. until it contained the chlorine contents indicated in the following table. The chlorination was carried out in the presence of polyvinyl chloride having a K value of 70 in an amount such that the final product contained 20% thereof.

Tests revealed that under the reaction conditions polyvinyl chloride is not or only slightly chlorinated.

After rolling at 175° C. and pressing, the following values were found:

| Chlorine content of chloropoly-ethylene, percent | Notched bar impact strength 20° C., cm. kg./cm.² | Tensile strength, kg./cm.² | Elongation at break, percent | Dimensional stability | | Modulus in torsion, kg./cm.² | | |
|---|---|---|---|---|---|---|---|---|
| | | | | Vicat, °C. | Martens, °C. | 80° C. | 90° C. | 100° C. |
| 65 | 3 | 680 | 25 | 76 | 62 | 82 | | |
| 70 | 2 | 720 | 15 | 110 | 86 | 3,300 | 2,800 | 200 |
| 75 | 2 | 750 | 10 | 132 | 109 | 6,000 | 3,400 | 2,900 |

The chlorinated polyethylenes obtained were rolled with 3% of tribasic lead sulflate and dibasic lead stearate and granulated. Only the granules of the product containing 65% of chlorine could be well extruded to give a tube. The other two chloropolyethylenes yielded on the extruder tubes having rough internal surfaces.

Under the conditions set forth above a chlorination product was prepared which contained only 40% of chlorine and 20% of polyvinyl chloride added prior to the chlorination.

10, 20 and 35 parts, respectively, of said chlorination product were mixed on the roller at 175° C. with 90, 80 and 65 parts, respectively of the above highly chlorinated products. The following values were obtained:

| Cl content of highly chlorinated polyethylene, percent | Proportion of highly chlorinated polyethylene, percent | Notched var impact strength, 20° C. cm. kg./cm.² | Tensile strength, kg./cm.² | Elongation at break, percent | Dimensional stability | | Modulus in torsion, kg./cm.² | |
|---|---|---|---|---|---|---|---|---|
| | | | | | Vicat, °C. | Martens, °C. | 80° C. | 100° C. |
| 65 | 80 | 5 | 550 | 35 | 72 | 60 | | |
| 70 | 80 | 6 | 500 | 30 | 92 | 76 | 1,400 | 60 |
| | 65 | 13 | 310 | 50 | 76 | 55 | 330 | |
| 75 | 90 | 3 | 600 | 15 | 110 | 85 | 4,000 | |
| | 80 | 4 | 500 | 20 | 106 | 83 | 2,300 | 900 |
| | 65 | 9 | 200 | 30 | 81 | 60 | 450 | 200 |

On the extruder the mixtures of 80 parts of the chlorinated polyethylenes having a chlorine content of 65 or 70% of chlorine, respectively, with 20 parts of chlorinated polyethylene having a chlorine content of 40% could be well processed to yield tubes having smooth internal surfaces.

A comparison of the above values indicates that only in the narrow range claimed mixtures are obtained which have the required favorable properties.

Example 3

Powdery low pressure polyethylene having a reduced specific viscosity of 4.5 was chlorinated in water as described in Example 1 in the presence of such an amount of polyvinyl chloride having a K value of 70 that the final product contained 30% of PVC. The chlorination was carried out in stages as follows:

| | Chlorination temperature, °C. | Up to a chlorine content, percent |
|---|---|---|
| 1st stage | 70 | 10 |
| 2d stage | 129 | 30 |
| 3d stage | 126 | 70 |

The coarse-grained chlorination product obtained had a good thermostability on the roller at 175° C. With the use of 1% of barium-cadmium stabilizer (Ferro 1825 of the firm Bärlocher, Munich, Federal Republic of Germany) the product underwent decomposition after 50 minutes only, while polyvinyl chloride which had been afterchlorinated in water and had the same chlorine content decomposed in the same test already after 17 minutes.

For determining the mechanical and thermal values four specimens, containing the stabilizers defined in Example 1, were rolled at 175° C. and pressed.

Specimen A was the pure chlorination product described above in this example.

Specimen B was a mixture of 90 parts of A with 10 parts of a chlorinated polyethylene which had been prepared from powdery low pressure polyethylene having a reduced specific viscosity of 4.5, first by chlorinating at 75° C. (up to a chlorine content of 10%) and then at 118° C. (residual chlorine absorption up to 37%) in the presence of such an amount of polyvinyl chloride (K value 70) that the final product contained 20% by weight thereof.

Specimen C was a mixture of 80 parts of A and 20 parts of the chlorinated polyethylene having a chlorine content of 37%.

Specimen D was a mixture of 100 parts of C with 20 parts of polymethylmethacrylate having a Vicat temperature of 110° C.

The following values were obtained:

| Specimen | Notched bar impact strength 20° C. cm. kg./cm.² | Tensile strength 100° C. kg./cm.² | Elongation at break, 100° C. percent | Vicat temperature, °C. | Modulus in torsion, kg./cm.² | |
|---|---|---|---|---|---|---|
| | | | | | 80° C. | 100° C. |
| A | 2-3 | 220 | 250 | 101 | | 300 |
| B | 4 | 210 | 240 | 99 | 1,700 | 100 |
| C | 11 | 175 | 215 | 90 | 1,000 | 30 |
| D | 4 | 190 | 235 | 95 | 1,400 | 180 |

Example 4

The following table illustrates the different solubility and thermostability of products that have been chlorinated to a large extent at different temperatures. Sample 1 was the comparative polyethylene of Example 1 which had been chlorinated at 98° C., samples 2, 3, and 4 were the chloropolyethylenes of Example 2 and sample 5 was specimen A of Example 3.

In order to determine the solubility in cold carbon tetrachloride each time 4 grams of chloropolyethylene were kept for one day at 20° C. in 400 cc. of carbon tetrachloride and the residue was then determined. A further sample of 4 grams was boiled for one hour in 400 cc. of carbon tetrachloride and after having filtered the residue was determined. For determining the thermostability the chloropolyethylenes were stabilized with 1% of Ferro 1825 (complex barium-cadmium stabilizer defined above) and rolled at 175° C. until the sample turned black.

| Sample | Cl, percent | Residue at 20° C., percent | In CCl₄ on boiling, percent | Thermostability on the roller at 175° C./minutes |
|---|---|---|---|---|
| 1 | 70 | None | None | 5 |
| 2 | 65 | 89 | 83 | 50 |
| 3 | 70 | 30 | 22 | 20 |
| 4 | 75 | 34 | 11 | 35 |
| 5 | 70 | 80 | 52 | 50 |

We claim:
1. A composition having a thermal stability under load according to Vicat of greater than 90° C., a modulus in torsion of greater than 1000 kg./cm.$^2$ at 80° C., and a notched bar impact strength of at least 3 cm. kg./cm.$^2$ consisting of a compatible blend of (1) 95 to 75 parts by weight of a chlorinated polymer of 100 to 95% by weight of ethylene and 0 to 5% by weight of an alpha mono-olefin having 3 to 4 carbon atoms, said chlorinated polymer containing 68 to 75% by weight of chlorine, and (2) 5 to 25 parts by weight of a chlorinated polymer of 100 to 95% by weight of ethylene and 0 to 5% by weight of an alpha mono-olefin having 3 to 4 carbon atoms, said chlorinated polymer containing 25 to 50% by weight of chlorine, both chlorinated polymers being obtained by chlorinating a linear polyolefin of a density of 0.94 to 0.96, a reduced specific viscosity (measured in a 0.5% solution in tetrahydronaphthalene) of 1.5 to 10 and a crystallite melting point of 127–136° C. at least 20% of the chlorine being incorporated in said polyolefin at a temperature between about 100° C. and about 150° C., and both chlorinated polymers being insoluble in carbon tetrachloride at room temperature and at most partially soluble in carbon tetrachloride at its boiling point.

2. A composition as defined in claim 1 wherein the polymers are polyethylenes.

3. A composition comprising 70% to 95% by weight of a composition as defined in claim 1 and 5% to 30% by weight of a polymeric material selected from the group consisting of styrene-acrylonitrile copolymers and methacrylic acid ester polymers.

4. A composition as defined in claim 3 wherein the polymer is a co-polymer of styrene and acrylonitrile.

5. A composition as defined in claim 3 wherein the polymer is a polymer of a methacrylic acid ester.

6. A composition as defined in claim 3 wherein the polymer is a polymer of methacrylic acid methyl ester.

References Cited
UNITED STATES PATENTS

| | | | |
|---|---|---|---|
| 2,268,162 | 12/1941 | Myles et al. | 260—897 |
| 3,006,889 | 10/1961 | Frey et al. | 260—897 |
| 3,066,109 | 11/1962 | Hechtman et al. | 260—899 |
| 3,076,781 | 2/1963 | Frey et al. | 260—897 |
| 3,086,957 | 4/1963 | Carter | 260—897 |
| 3,149,183 | 9/1964 | Salyer et al. | 260—897 |
| 3,227,781 | 1/1966 | Klug et al. | 260—897 |
| 3,242,234 | 3/1966 | Frey et al. | 260—897 |
| 3,299,182 | 1/1967 | Jennings et al. | 260—897 |
| 3,291,863 | 12/1966 | Frey et al. | 260—897 |

MURRAY TILLMAN, *Primary Examiner.*

C. S. SECCURO, *Assistant Examiner.*